United States Patent
Sbaiz

(10) Patent No.: US 8,958,484 B2
(45) Date of Patent: Feb. 17, 2015

(54) ENHANCED IMAGE AND VIDEO SUPER-RESOLUTION PROCESSING

(75) Inventor: Luciano Sbaiz, Zurich (CH)

(73) Assignee: Google Inc., Mountain View, CA (US)

( * ) Notice: Subject to any disclaimer, the term of this patent is extended or adjusted under 35 U.S.C. 154(b) by 839 days.

(21) Appl. No.: 12/539,432

(22) Filed: Aug. 11, 2009

(65) Prior Publication Data

US 2011/0037894 A1  Feb. 17, 2011

(51) Int. Cl.
*G06T 1/00* (2006.01)
*H04N 7/01* (2006.01)

(52) U.S. Cl.
CPC .............. *G06T 1/00* (2013.01); *H04N 7/0125* (2013.01)
USPC .................................................. 375/240.26

(58) Field of Classification Search
USPC ....................................... 375/240.26; 382/299
See application file for complete search history.

(56) References Cited

U.S. PATENT DOCUMENTS

| | | | | |
|---|---|---|---|---|
| 7,373,019 | B2 * | 5/2008 | Zomet et al. | 382/299 |
| 2007/0217713 | A1 * | 9/2007 | Milanfar et al. | 382/299 |
| 2008/0112630 | A1 * | 5/2008 | Nestares et al. | 382/236 |
| 2009/0245375 | A1 * | 10/2009 | Liu | 375/240.16 |
| 2009/0245692 | A1 * | 10/2009 | Okutomi et al. | 382/294 |
| 2010/0014709 | A1 * | 1/2010 | Wheeler et al. | 382/103 |
| 2010/0027664 | A1 * | 2/2010 | Sato | 375/240.16 |
| 2010/0259607 | A1 * | 10/2010 | Kennedy et al. | 348/113 |

OTHER PUBLICATIONS

Farsiu, S., et al., "Fast and robust multiframe super-resolution," IEEE Transactions on Image Processing, Oct. 2004, vol. 13, No. 10, pp. 1327-1344.

Sbaiz, L., et al., "Groebner Basis Methods for Multichannel Sampling with Unknown Offsets," Applied and Computational Harmonic Analysis, 2008, vol. 25, No. 3, pp. 277-294.

Vandewalle, P., et al., "Super-Resolution from Unregistered and Totally Aliased Signals Using Subspace Methods," IEEE Transactions on Signal Processing, Jul. 2007, vol. 55, No. 7, Part 2, pp. 3687-3703.

Vandewalle, P., et al., "A Frequency Domain Approach to Registration of Aliased Images with Application to Super-Resolution," EURASIP Journal on Applied Signal Processing, 2006, Article ID 71459, 14 pages, vol. 2006.

Zisserman, A., et al., "Computer Vision Applied to Super Resolution," Signal Processing Magazine, IEEE, May 2003, vol. 20, pp. 75-86.

* cited by examiner

*Primary Examiner* — Andy Rao
*Assistant Examiner* — Obafemi Sosanya
(74) *Attorney, Agent, or Firm* — Fenwick & West LLP

(57) ABSTRACT

A system and method generates super-resolution images and videos using motion-compensated low-resolution images and videos. An image is selected as a primary image from a plurality of low-resolution images and the rest of the low-resolution images are registered as secondary images with respect to the primary image. Each registered secondary image is transformed to a motion compensated image. A mask value for a pixel in each motion compensated image is estimated. The super-resolution image of the primary image is generated by combining the mask values and the motion compensated secondary images. Similarly, a low-resolution video is segmented into a plurality of video objects, each of which is represented by an alpha layer. A super-resolution frame of the segmented video object is generated. The super-resolution frames of each segmented video object are combined using the alpha layers to create a super-resolution frame of the resulting video.

31 Claims, 11 Drawing Sheets

602

602M

604

604M

606

606M

Input Video Frames    1010

Output Video Frames    1020

ENHANCED IMAGE AND VIDEO SUPER-RESOLUTION PROCESSING

BACKGROUND OF THE INVENTION

The present invention relates generally to creating super-resolution images and videos from low-resolution images and videos, and more particularly to a method for creating super-resolution images and videos using motion compensated low-resolution images and videos.

BACKGROUND

Super-resolution (SR) image processing refers to techniques that enhance the resolution of an image processing system or a video processing system. Super-resolution in image and video technology enables various applications to increase the resolution of a low-resolution image or a low-resolution video. For example, in television technology using image up-sampling, it is possible to convert a standard definition video sequence in into one in high definition TV format. An image taken with a low-resolution camera (such as a camera integrated in a mobile phone or similar devices) can be converted to a higher resolution image to be displayed or printed.

A typical super-resolution algorithm employs two processing stages. First, multiple low-resolution images are registered with an image processing system, where one of the low-resolution image is selected as a primary image and horizontal and vertical displacements of the rest of the low-resolution images (i.e., secondary images) are computed with respect to the primary image. Second, the registered images are combined together to create a super-resolution image using the displacement information and aliasing information present in the low-resolution images. A problem with this approach arises when outliers are present on the low-resolution images. An outlier is a region in a low-resolution image that does not follow the motion model dominant in the multiple low-resolution images. This may be due to an inaccurate motion model having objects moving across the multiple low-resolution images, or optical distortion of the camera that captured the low-resolution images. Aliasing on the primary and secondary images also leads to outlier regions, for example, along object edges and in textured regions. Outliers negatively affect the image registration because they are not included in the motion model. Outliers introduce artifacts in the super-resolution image because the low-resolution images including the outliers are not correctly registered. Most existing super-resolution algorithms often neglect the presence of the outliers, and in particular the effects of aliasing, in the image registration phase. This introduces registration errors that cannot be compensated in the reconstruction phase, limiting the applicability of these algorithms.

Another class of existing super-resolution algorithms combines image registration and super-resolution image creation in a single stage. This approach may make the algorithms precise when aliasing is the only source of outliers. However, these methods are highly complex and difficult to implement. These algorithms often assume input low-resolution images are obtained by simple translation from each other, and ideal sampling of the super-resolution image to be created. This assumption is an over-simplification since, in fact, the multiple images almost always differ from the primary image by more than just linear translation. Similar problems with existing super-resolution algorithms exist in super-resolution video processing, where the input low-resolution images are the consecutive video frames of a low-resolution video.

SUMMARY

A method, system and computer program product are provided for generating super-resolution images and videos using motion compensated low-resolution images and videos.

In one embodiment, the method is applied to a plurality of low-resolution images. One of the low-resolution images is selected as a reference image (also called a primary image); the remaining low resolution images are non-reference images (also called secondary images). Each secondary image is registered with respect to the primary image. This allows transforming the secondary images to motion compensated images. For each motion compensated secondary image, a mask value for each pixel of the secondary image is estimated based on a registration error of the secondary image with respect to the primary image. In one embodiment, the mask value for a pixel in the secondary image indicates a likelihood that the pixel will be included in the super-resolution image. A super-resolution image of the primary image is then generated by combining the mask values and the motion compensated secondary images.

In another embodiment, the method is applied to video frames in a low-resolution video including a plurality of video frames in a temporal order. The low-resolution video is segmented into a plurality of video objects, where each video object is represented by an alpha layer and the plurality of the segmented video objects are ordered according to the temporal order of the video frames. For each frame having a segmented video object in the temporal order, a super-resolution frame of the segmented video object is generated. The super-resolution frames of each segmented video object are combined using the alpha layers to create a super-resolution frame of the resulting video.

Similarly to the super-resolution image creation, one of the video frames is selected as primary and a subset of the remaining frames are considered as secondary frames. The secondary frames can be a subset constructed by selecting frames temporally close to the primary frame. Each video object on the secondary frames is registered with respect to the same video object on the primary frame. For each video object, a different motion model is used to account for the different motions on the scene. A motion compensated frame is created for each video object and a mask value for each pixel is computed by processing a registration error of the video object in the secondary frame with respect to the primary frame. A super-resolution frame of each video object is computed by combining the motion compensated frames of the video object and the mask values. The super-resolution frame of the primary frame is generated by combining the super-resolution frames of the different video objects using the corresponding alpha layers. To process the whole video, the procedure is repeated by selecting each frame of the input video as the primary frame.

An embodiment of an image super-resolution system includes a registration module, a weight estimation module, an outlier mask module and an image super-resolution creation module. The registration module is configured to receive a plurality of low-resolution images, one of which is selected as a primary image and the rest of which are secondary images. The registration module is configured to transform each secondary image into a motion-compensated image by registering each secondary image with respect to the primary image using the weights estimated by the weight estimation module. For each motion compensated secondary image, the outlier mask module is configured to estimate a mask value for each pixel of the secondary image based on the registration error of the secondary image with respect to the primary image. The image super-resolution creation module is configured to generate a super-resolution image of the primary by combining the mask values and the motion compensated secondary images.

In another embodiment, a video super-resolution system includes a segmentation module, a plurality of image super-resolution modules, an alpha blending module and a circular buffer. The segmentation module is configured to receive a plurality of video frames of a low-resolution video low-resolution video. The segmentation module is further configured to segment the low-resolution video into a plurality of video objects, where each video object is represented by an alpha layer and the plurality of the segmented video objects are ordered according to the temporal order of the video frames. For each frame of the segmented video object in the temporal order, a super-resolution frame of the segmented video object is generated by the plurality of the image super-resolution modules. The alpha blending module is configured to combine the super-resolution frames of each segmented video object to create a super-resolution frame of the resulting video.

The plurality of image super-resolution modules are configured to select one of the video frames as primary and a subset of the remaining frames as secondary. Each video object on the secondary frames is registered with respect to the same video object on the primary frame by an image super-resolution module of the plurality of the image super-resolution modules. A motion compensated frame is created by the image super-resolution module for each video object and a mask value for each pixel is computed by processing the registration error with respect to the primary frame. A super-resolution frame of each video object is computed by combining the motion compensated frames of the video object and the mask values. The super-resolution frame of the primary frame is obtained by combining the super-resolution frames of the different video objects using the corresponding alpha layers. To process the whole video, the procedure is repeated by selecting each frame of the input video as the primary frame.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

Figure 1:
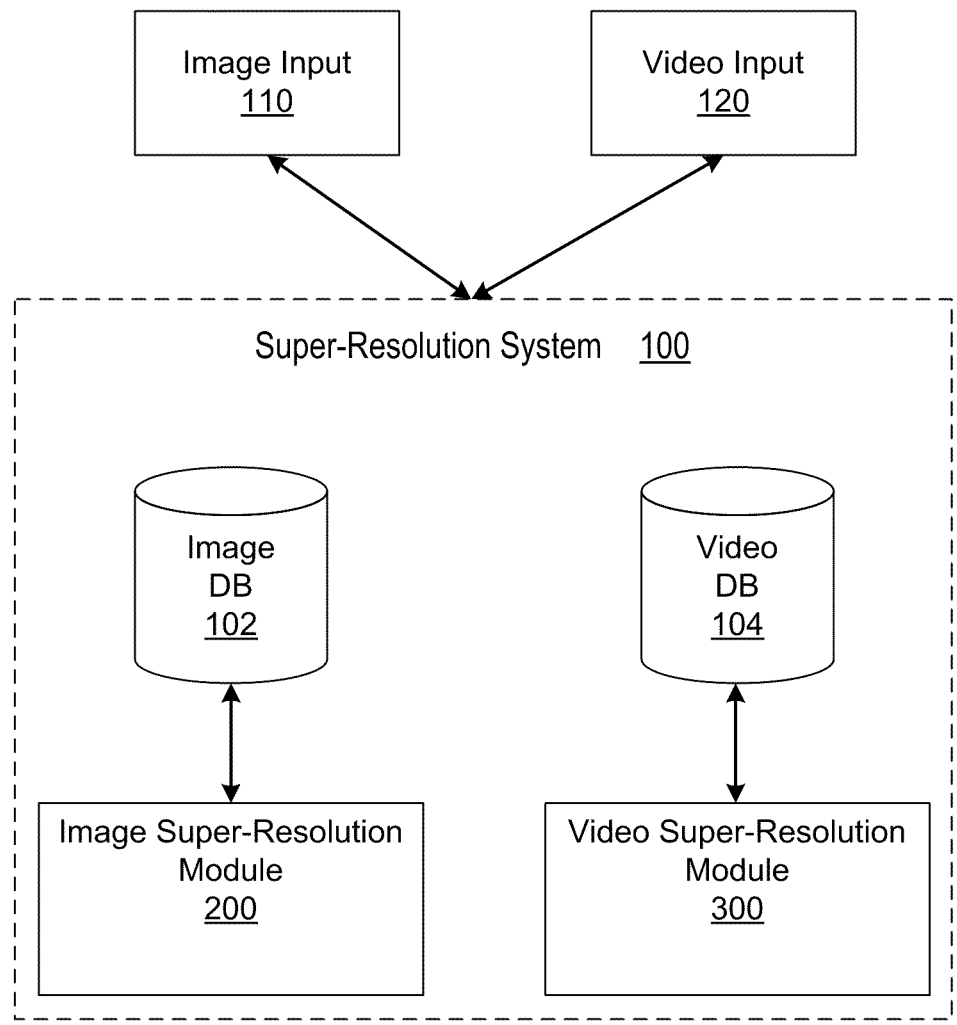
FIG. 1 is a block diagram illustrating a super resolution system for super-resolution image processing and super-resolution video processing.

FIG. 1 is a block diagram illustrating a super-resolution system 100 for super-resolution image processing and super-resolution video processing. The system 100 includes an image super-resolution module 200 and a video super-resolution module 300. Other embodiments of the super-resolution system 100 may include only one of the super-resolution module 200 and the video super-resolution module 300. The super-resolution system 100 receives one or more low-resolution images from an image input 110 and stores the received images in an image database 102. The image database 102 is connected to the image super-resolution module 200. The super-resolution system 100 also receives one or more low-resolution videos from a video input 120 and stores the low-resolution videos in a video database 104. The video database 104 is connected to the video super-resolution module 300. The image super-resolution module 200 creates a super-resolution image of a selected low-resolution image from the low-resolution images stored in the image database 102, and is further described in FIG. 2. The video super-resolution module 300 creates a super-resolution video from a low-resolution video stored in the video database 104, and is further described in FIG. 3.

The super-resolution system 100 is implemented on computer system, comprising one or more processors, main memory, secondary storage, network interfaces, peripheral interfaces, and the like, as known to those of skill in the art. These aspects are not illustrated in the figures, nor described here, so as to not obscure the details of the invention. Further, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. Where the modules as implemented by software, they are stored on a computer readable storage device (e.g., hard disk), loaded into the main memory, and executed by the one or more processors included as part of the system 100. Alternatively, hardware or software modules may be stored elsewhere within the system 100. The operations of the system 100 and its modules will be further described below with respect to FIG. 2 and the remaining figures. As will become apparent, the various data processing operations described herein are sufficiently complex and time consuming as to require the operation of a computer system such as the system 100. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module.

Figure 2:
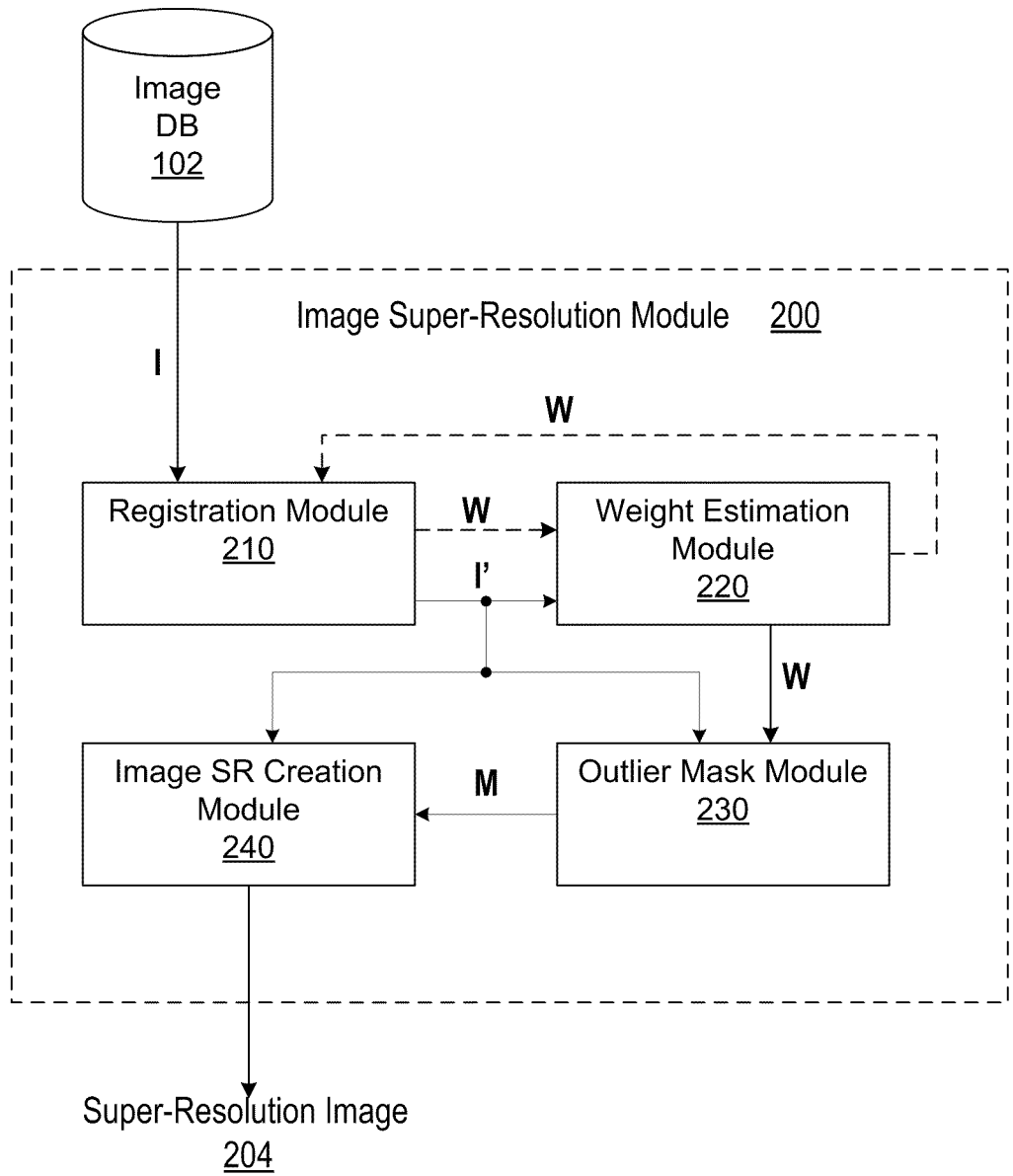
FIG. 2 is a block diagram showing an image super-resolution module having an image super-resolution engine for creating a super-resolution image.

FIG. 2 is a block diagram showing an image super-resolution module 200 for creating a super-resolution image 204. The image super-resolution module 200 receives a plurality of low-resolution images stored in the image database 102, and selects one of the low-resolution images as a reference image (also called a primary image) and the remaining low-resolution images are non-reference images (also called secondary images). The image super-resolution module 200 processes the low-resolution images and generates a super-resolution image 204 of the reference image. The image super-resolution module 200 comprises a registration module 210, a weight estimation module 220, an outlier mask module 230 and an image super-resolution creation module 240.

The registration module 210 receives a plurality of low-resolution images $I_0, \ldots, I_{N-1}$ and generates a plurality of motion compensated low-resolution images $I_1', \ldots, I_{N-1}'$ using the weights estimated by the weight estimation module 220. Specifically, the registration module 210 selects one of the low-resolution images $I_0, \ldots, I_{N-1}$ as a reference image, and the remaining low resolution images are non-reference images. For example, the registration module 210 selects the low-resolution image $I_0$ as the primary image and the rest of the low-resolution images $I_1, \ldots, I_{N-1}$ are secondary images. The registration module 210 measures a displacement of the secondary images from the primary image. In one embodiment, the registration module 210 minimizes the residual error of the motion compensated secondary image with respect to the primary image. This corresponds to the minimization of the cost function below:

$$J_i = \sum_{x,y}^{N-1} h(I_0(x, y) - I_i'(x, y)) \quad (1)$$

where $i=1 \ldots N-1$ is the image index and $(x, y)$ are the coordinates of a pixel in a low-resolution image. The image $I_i'(x, y) = w(I_i(x, y), \theta_i)$ is the motion compensated image of $I_i$, i.e. an image for which the movement of the camera that captured the low-resolution image $I_i$ has been compensated. The motion compensated image $I_i'(x, y)$ can be computed by applying a warping function $w(I_i(x, y), \theta_i)$ to the secondary image $I_i$. The vector $\theta_i$ represents the motion parameters, i.e., a set of values that represent the movement of the camera.

The registration module 210 minimizes the cost function $J_i$ described in equation (1) using a non-linear minimization technique, such as the Gauss-Newton (GN) method or the Levenberg-Marquardt (LM) algorithm. The minimization comprises a number of steps that update the motion parameters at each step. Each step is alternated with the application of the weigh estimation module 220 that determines the weight of each pixel. Each update is determined by solving a system of linear equations, associated to the residual error $e_i$ of each pixel, i.e., $e_i(x, y) = I_0(x,y) - I_i'(x, y)$. For example, in the case of the GN iteration, the updates $\delta\theta_i$ of the parameters $\theta_i$ are computed by solving the systems of equations below:

$$\left[\sum_{x,y} W_i(x, y) \frac{\partial e_i(x, y)}{\partial \theta_i^{(j)}} \frac{\partial e_i(x, y)}{\partial \theta_i^{(k)}}\right]_{(j,k)} \delta\theta = \quad (2)$$

$$-\left[\sum_{x,y} W_i(x, y) \frac{\partial e_i(x, y)}{\partial \theta_i^{(j)}} e_i(x, y)\right]_{(j)}$$

where $\theta_i^{(j)}$ is the j-th entry of the motion parameters $\theta_i$.

The contribution of each pixel $(x, y)$ to the system in the equation (2) above is weighted by a value $W_i(x, y)$. Pixels with higher weights are considered more reliable than pixels with lower weights, and pixels with higher weights contribute more significantly to the result of the registration module 210 and the creation of the super-resolution image 204. For the following iterations, the weights $W_i(x, y)$ are determined by the estimation module 220 according to the registration errors between the motion compensated secondary images and the primary image.

The optimal choice of the function h of equation (1) follows the Maximum Likelihood (ML) principle which determines h according to the Probability Distribution Function (PDF) of the residual error $e_i$. The residual errors are normalized with respect to a standard deviation $\sigma$, which corresponds to a choice of h of the form $h(e) = \rho(e/\sigma)$. The value of $\sigma$ determines the scale of the residual errors, while $\rho$ determines the shape of the histogram of the residual errors. The optimal weights $W_i(x, y)$ are related to the distribution $\rho$ and $\sigma$. An approximation of the optimal weight $W_i(x, y)$ is set by the following equation:

$$W_i(x, y) = \frac{1}{e} \frac{dh(e)}{de} \quad (3)$$

The choice of $\rho$ and $\sigma$ determines the behavior of the image super-resolution module 200 and can be chosen according to the residual errors distribution. In one embodiment, the residual errors are assumed to belong to a certain type of distribution, for example, a Cauchy or Lorentzian distribution. In this case, the distribution of the residual errors is fully defined by the parameter $\sigma$, which determines the relation between the residual errors and the weights. The weight estimation module 220 determines only the scale $\sigma$ and applies the equation (3) to determine the weight associated with each pixel. In another embodiment, the weight estimation module 220 determines both $\rho$ and $\sigma$ using the low-resolution images to be weighted.

Given the weights $W_i(x, y)$ determined by the weight estimation module 220, the registration module 210 refines the motion parameters computing the next GN or LM iteration. Specifically, in the case of GN iteration, the module 210 solves the system of equation (2) for each of the secondary images and updates the motion parameters according to $\theta_i' = \theta_i + \delta\theta_i$, where $\theta_i'$ is the new estimation of the motion parameters. The registration module 210 computes a new set of the motion compensated images $I_1', \ldots, I_{N-1}'$, and sends the motion compensated $I_1', \ldots, I_{N-1}'$ to the weight estimation module 220 to computes weights for each secondary image in a second iteration. The modules 210 and 220 are applied alternatively to minimize the registration error and to improve the accuracy of weight estimation. The number of total iterations needed is determined by the registration module 210 based on the cost function $J_i$ described in equation (1), the motion parameters update magnitude, or the convergence of the weights of the secondary images over multiple iterations (e.g., the weights at the final iteration cease to change significantly compared with those of previous iterations). The secondary images $I_1', \ldots, I_{N-1}'$ from the last iteration are sent to the outlier mask module 230 and the image super-resolution creation module 240 for further processing.

The outlier mask module 230 receives the motion compensated secondary images $I_1', \ldots, I_{N-1}'$ and the primary image from the registration module 210 and their associated weights $W_i(x, y)$ from the weight estimation module 220. As mentioned above, the weight $W_i(x,y)$ of each pixel in a secondary image indicates how likely the pixel follows the motion estimated by the registration module 210. Thus, the weights can be used to identify the presence of outliers in the secondary image. An outlier is a region in a low-resolution image that does not follow a motion model dominant in the low-resolution images. The outlier mask module 230 uses the weights of a secondary image to locate outliers in the secondary image. For example, when there are objects (e.g., a car) moving across multiple low-resolution images captured by a camera, the movement of the camera corresponds to the dominant motion modeled by the image registration module 210, while the moving objects are detected as outliers by the outlier mask module 230.

The outlier mask module 230 computes a mask value for each pixel in a motion compensated secondary image and the primary image. A mask value of a pixel takes values in range between 0 and 1. A large value of a mask value of a pixel indicates that the pixel follows reliably the motion model estimated by the registration module 210. A small value of a mask value is assigned to a pixel that is likely to be part of an outlier. The mask value for each pixel of the primary image is 1 since all the pixels in the primary image are used to create the super-resolution image 204. An important feature of the mask module 230 is to distinguish between outliers and aliasing. Aliasing may introduce large registration errors and therefore appear on the weights $W_i(x, y)$. However, aliasing is used to compute the super-resolution image 204. Therefore, regions with large aliasing magnitude (typically, along edges and regions with texture) should not be masked by the mask module 230.

In one embodiment, the outlier mask module 230 computes the mask values based on a multiresolution decomposition of the primary image and the motion compensated secondary images. A multiresolution decomposition of an image is convenient in computing mask values because it allows distinction between regions with large registration errors, typically associated with outliers and isolated large registration errors, which are often associated with a large aliasing component. The multiresolution decomposition of an image comprises multiple levels of representation of the image, where the representations of the image at different levels have different resolutions from each other. The outlier mask module 230 starts the mask values computation at the coarsest level of the representation which has the smallest resolution. At each level of the multiresolution decomposition of a secondary image, the outlier mask module 230 computes the absolute difference between the primary image at the same level of the multiresolution decomposition and the motion compensated secondary image. The outlier mask module 230 applies a smooth thresholding function to the resulting absolute difference to generate the mask values for the secondary image.

Figure 4:
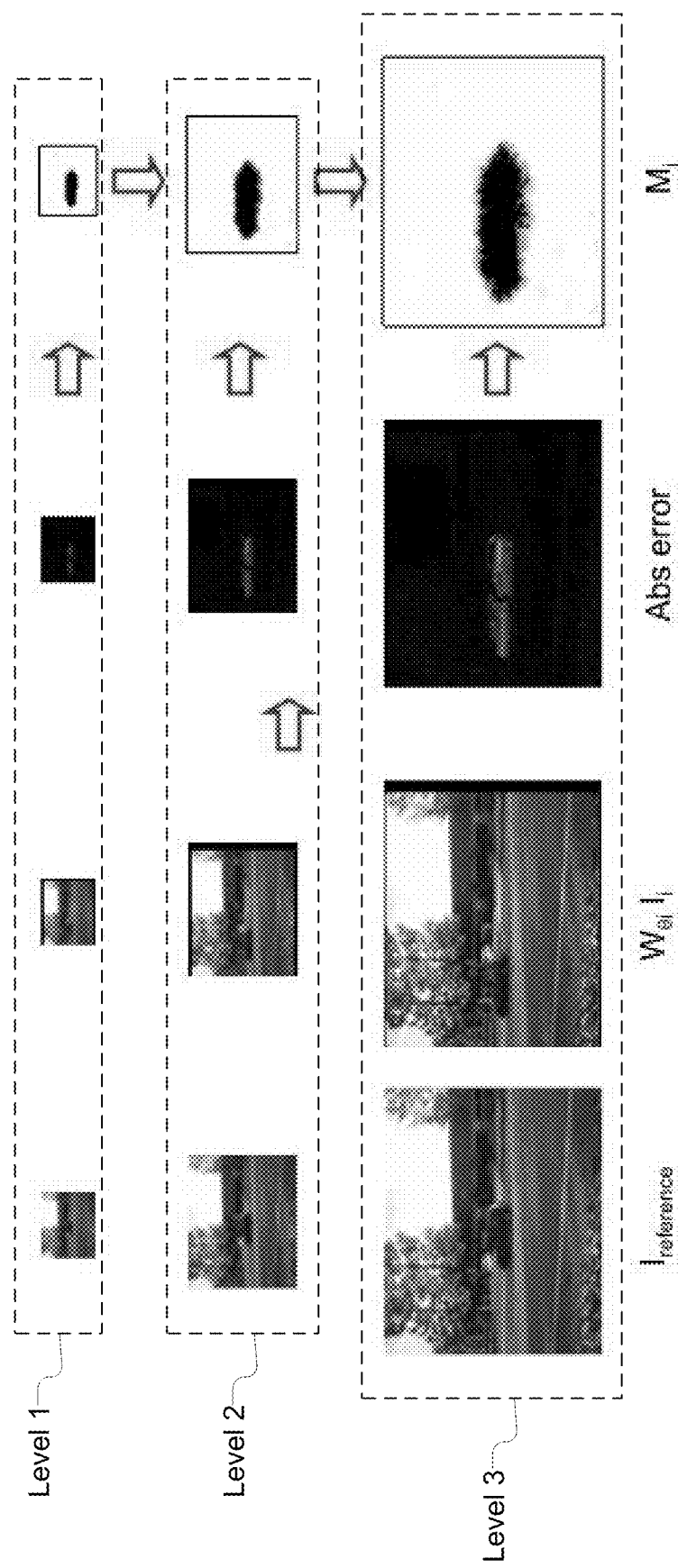
FIG. 4 is an exemplary outlier mask computation using multi-scale representations.

Referring now to FIG. 4, there is illustrated an exemplary outlier mask value generation using multiresolution decomposition. The primary image $I_{reference}$ (i.e., leftmost image in each row) and the weighted secondary image $W_{\theta_i}I_i$ (i.e., the second image left) are represented by their perspective images at three different levels, i.e., level 1, level 2 and level 3. Level 1 represents the coarsest level of the primary image or the motion compensated secondary image, which have the smallest resolution. Level 3 represents the finest level of the primary image or the weighted secondary image, which have the largest resolution. The images at the third column from the left represent the absolute difference between the primary images and the weighted secondary images at three decomposition levels. The outlier mask module 230 applies a smooth thresholding function to the absolute differences at three decomposition levels to generate the mask values for the secondary images at three decomposition levels (i.e., the rightmost images of FIG. 4). The dark areas in the masks at each decomposition level indicate the locations of the outliers in the secondary image.

Figure 5:
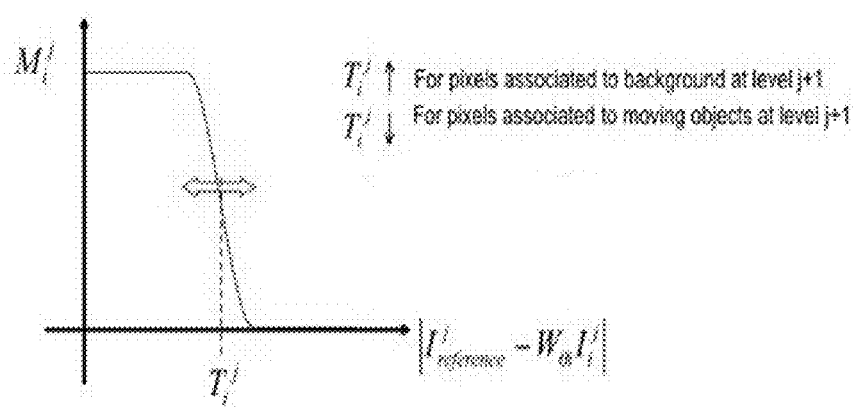
FIG. 5 is an exemplary smooth thresholding of image registration errors.

The mask value of the secondary image at the finest decomposition level of the multiresolution decomposition is obtained from the mask value at a coarser level of the multiresolution decomposition. In one embodiment, the outlier mask module 230 adjusts the smooth thresholding value applied to the mask value at the finest decomposition level according to the result of the smooth thresholding at the coarser level of the multiresolution decomposition. FIG. 5 is an exemplary smooth thresholding of image registration errors. The parameter j is the level of the multiresolution decomposition, and $T_i^j$ is the thresholding value for the motion compensated secondary image $W_{\theta_i}I_i^j$ at j-th level of the multiresolution. At the coarsest resolution, $T_i^j$ is set to $T_{init}$, which is a predetermined initial thresholding value. Based on the result of thresholding at the coarsest level, a value of the threshold is determined for the next finer level of the decomposition. The threshold is a function of the pixel coordinates. The threshold is smaller for pixels close to the outlier pixels determined at the previous decomposition level and larger for pixels that were not outliers at the previous decomposition level. In one embodiment, the threshold is fined as the following:

$$T_i^j(x,y) = T_{init} p^{j=1-r(M_i^{j-1}(x,y))}$$

where p is a scalar larger than 1 and p controls the correction of the threshold. The term $r(M_i^{j-1}(x,y))$ produces the variation of the threshold based on the result thresholding at the coarser level. The function r realizes the interpolation of the mask (e.g., to double the resolution at each level of the decomposition) and some filtering to promote larger outlier regions. One way to realize this operation of r is to apply morphological dilation.

Figure 6:
FIG. 6 shows examples of a primary image and two secondary images and their corresponding masked images.
Figure 6:
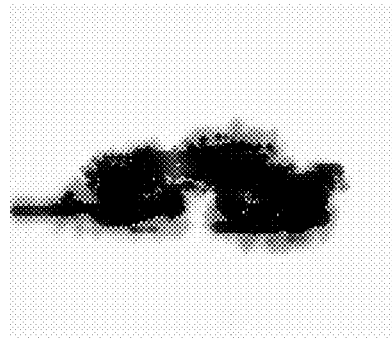
Figure 6:
Figure 6:
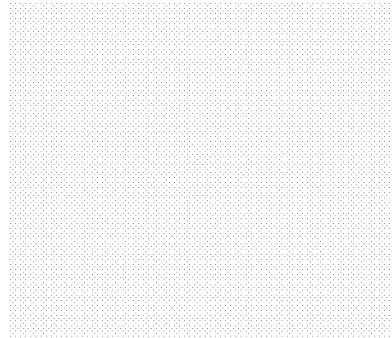
Figure 6:
Figure 6:
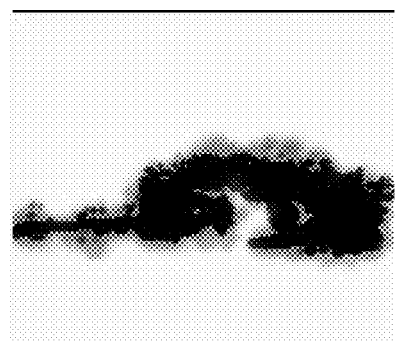

FIG. 6 shows examples of a primary image and two secondary images and their corresponding masked images. For the primary image 604, the mask values for each pixel of the primary image 604 are one because all pixels of the primary image 604 are used to compute the corresponding super-resolution image of the primary image 604. Image 604M represents the masked primary image 604 where no outliers are located in the primary image 604. The secondary images 602 and 606 have a moving object in the images, i.e., a moving car at a different position from its original position in the primary image 604. The images 602M and 606M represent the masked secondary images of their respective unmasked images 602 and 606, where the dark areas in the images 602M and 606M indicate the positions of the moving car. The outlier mask module 230 sends the mask values of the primary and secondary images to the image super-resolution creation module 240 for further processing.

Referring back to FIG. 2, the image super-resolution creation module 240 receives the primary image, the motion compensated secondary images from the registration module 210 and the mask values of the primary image and the motion compensated secondary images from the outlier masks module 230, and creates the super-resolution image 204 of the primary image.

In one embodiment, the image super-resolution creation module 240 uses a cost function to estimate a super-resolution image X of a reference image $I_0$ using the motion compensated secondary images with their associated mask values. The super-resolution image is obtained using an iterative method that minimizes a cost function. At the first iteration, the super-resolution image X is set to be equal to the reference image $I_0$. The image super-resolution creation module 240 transforms the reference image $I_0$ to the super-resolution image X. The iterative method minimizes the cost function according to the following equation (4):

$$J_S = \sum_{i=0}^{N-1} f(I_i(x, y) - d \circ g \circ w(X(x, y), \theta_i)) + \alpha T(X(x, y)), \quad (4)$$

where $I_i$, i=1 ... N−1 are the secondary images. The function $d \circ g \circ w(X(x, y), \theta_i)$ represents the composition of down-sampling, low-pass filtering and warping of X. The goal of the function $d \circ g \circ w(X(x, y), \theta_i)$ is to represent the transformation that is applied to the super-resolution image X(x, y) to obtain each of the secondary images $I_i$. Specifically, the function $w(I_i(x, y), \theta_i)$ computes a warped version of X and the vector $\theta_i$ represents the motion parameters that map the image X on the image $I_i$. The motion parameters have been estimated by the registration module 210. The warped X(x, y) is low-pass filtered by the function g to simulate the behavior of camera optics, sensor and motion blurring. The low-pass filtered X(x, y) is down-sampled by the function d to reduce the number of pixels to that of the secondary image $I_i$.

The function f measures the error of the transformed $X_i(x, y)$ with respect to the secondary image $I_i$. When the transformed image $X_i(x, y)$ is correct, the error should be close to zero. Similar to optimal choice of the function h described in equation (1) above, the function f is chosen according to the distribution of the estimation errors. Typical choices of f are:

$L_1$ norm: $f(I(x,y)) = \Sigma_{x,y} |I(x,y)|$;

$L_2$ norm: $f(I(x,y)) = \Sigma_{x,y} I(x,y)^2$;

$L_p$ norm: $f(I(x,y)) = \Sigma_{x,y} I(x,y)^p$, where p is a parameter and p>0.

The additional term $\alpha T(X(x, y)$ in equation (4) is used to impose some degree of regularity to the image X. In most of the cases, the input secondary images are not sufficient to determine unambiguously the super-resolution image X. The typical choice for T is determined by a total variation measure described below:

$$T(X(x, y)) = \sum_{x,y} \sqrt{\|\nabla X\|^2 + \beta},$$

where $\beta$ is a regularization term that makes T differentiable. The constant $\alpha$ controls the trade-off between regularity and level of details of the result super-resolution image. A typical value of $\beta$ is, for example, $\beta=0.1$, and a typical value of $\alpha$ is $\alpha=5$, when the number of combined images N is 9.

The minimization of $J_s$ described in equation (4) is performed on a space of the possible images X, which has a dimension equal to the number of pixels of the super-resolution image. To limit the complexity of estimating X, the image super-resolution creation module 240 uses a steepest-descent method by applying the following iteration to the initial guess of X:

$$X_{i+1} = X_i + \mu \frac{d J_S}{d X},$$

where $\mu$ is step size and $\mu$ determines the speed of convergence of the iteration. For example, in one embodiment, $\mu=0.07$.

To consider the presence of outliers on the input image, the image super-resolution creation module 240 extends the cost function described in equation (4) to include the masks of the primary and secondary images as the following:

$$J'_S = \sum_{i=1}^{N-1} f((I_i(x, y) - d \circ h \circ w(X(x, y), \theta_i)) * M_i(x, y)) + \alpha T(X(x, y)), \quad (5)$$

where * is a pixel by pixel multiplication, and $M_i(x, y)$ is the mask of pixel (x, y) computed by the outlier masks module 230. The goal of the masks $M_i$ is to remove the regions of the secondary images $I_i$ that are not following the motion model such as the regions of objects moving on the scene and to copy instead such regions from the primary image.

Figure 3:
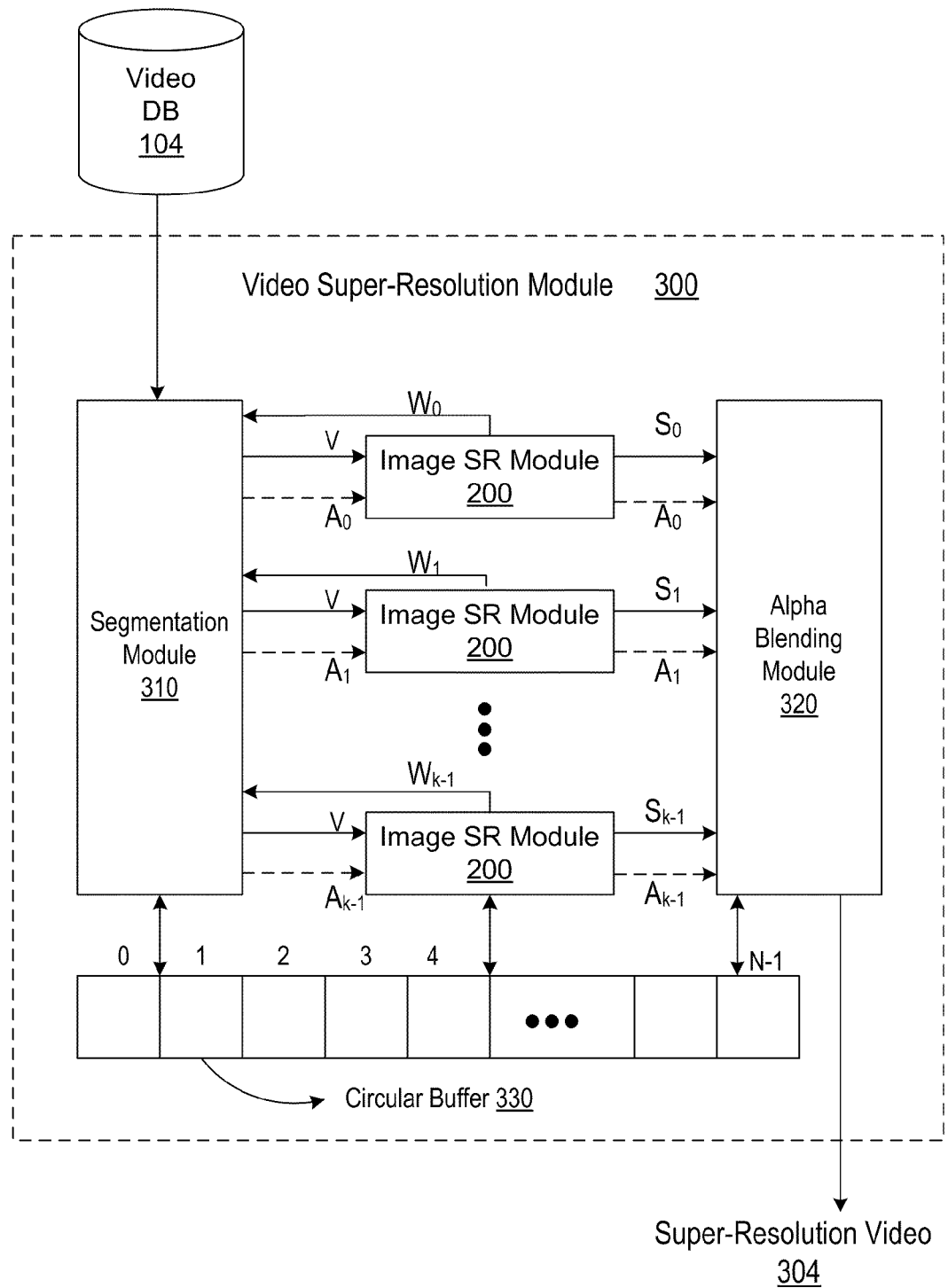
FIG. 3 is a block diagram showing a video super-resolution module for creating a super-resolution video.

FIG. 3 is a block diagram showing a video super-resolution module 300 for creating a super-resolution video 304. The image super-resolution processing described above can be applied to low-resolution videos to create super-resolution videos. The video super-resolution module 300 selects one video frame from a low-resolution video and creates a super-resolution frame for the selected video frame using an image super-resolution module similar as the one described with reference to FIG. 2. By sequentially creating a super-resolution frame for each video frame of the low-resolution video, the video super-resolution module 300 creates a super-resolution video for the low-resolution video. The video super-resolution module 300 comprises a segmentation module 310, a plurality of image super-resolution modules 200 of FIG. 2, and an alpha blending module 320. The super-resolution modules 200 operate on the different video objects determined by the segmentation module 310. Each super-resolution module 200 generates the region of the super-resolution frame corresponding to one of the video objects. The modules 200 operate on a set of secondary frames to increase the resolution of the primary frame, and the secondary frames are selected from the same low-resolution video. The video super-resolution module 300 may also include a circular buffer 330 of size N to store the primary and the secondary frames. The circular buffer 330 is coupled to the segmentation module 310, each one of the plurality of the image super-resolution modules 200 and the alpha blending module 320. To simplify the illustration of FIG. 3, only one image super-resolution module 200 is shown to be connected with the circular resolution 330. The size of the circular buffer 330 can be fixed or variable.

The segmentation module 310 receives a low-resolution video comprising multiple video frames stored in the video database 104, and segments the low-resolution video into multiple video objects. Each of the segmented video objects represents a moving area of the low-resolution video and is represented by an alpha layer $A_i$. For example, for K video objects in a video frame V of the low-resolution video, the alpha layers $A_0, \ldots, A_{K-1}$ are computed. The alpha layer $A_i$ takes the value 1 for the pixels corresponding to the video object i and 0 elsewhere in the video frame.

For example, a low-resolution video of a football game has a football stadium as a static background and multiple running players, referees and a moving football across the multiple frames of the low-resolution video. The segmentation module 310 segments the video of the football game into the video objects representing the running players, the referees and the moving football. In one embodiment, the segmentation module 310 segments a low-resolution video into multiple video objects using a graph-based image segmentation technique. Other video segmentation techniques are readily available to those of ordinary skills in the art.

The image super-resolution module 200 processes the segmented video objects (represented by their alpha layers $A_0, \ldots, A_{K-1}$) with respect to a video frame V of the low-resolution video and generates a super-resolution frame of the video frame V. The image super-resolution module 200 comprises a registration module 210, a weight estimation module 220, an outlier mask module 230 and an image super-resolution creation module 240 similar as those described with reference to FIG. 2. For each segmented video object of the video frame V, the image super-resolution module 200 generates a super-resolution frame $S_i$ using the circular buffer 330 and sends the super-resolution frames $S_0, \ldots, S_{K-1}$ to the alpha blending module 320 for further processing. The alpha blending module 330 combines the super-resolution frames corresponding to the different video objects to create a super-resolution frame of the output video. The alpha blending module 330 further combines the super-resolution frames for each input video frame of the lower-resolution video to create the super-resolution video and outputs the super-resolution video.

To group video frames of a low-resolution video, the video super-resolution module 300 includes a circular buffer 330. The circular buffer 330 consists of memory slots for N consecutive video frames of the low-resolution video starting at slot 0. For each new video frame to be processed, the content of the oldest video frame is replaced by the new video frame. For a group of video frames stored in the circular buffer 330, a reference frame (also called primary frame) can be chosen at any position of the buffer 330. To minimize the displacements of the reference frame with respect of the rest of the non-reference video frames in the buffer 330 (also called secondary video frames), the video super-resolution module 300 chooses the video frame at the center of the circular buffer 330 as the reference frame. Anther possibility is to choose the size of N of the circular buffer 330 and the position of the reference frame based on the type of the motion dominant in the low-resolution video. Choosing the size of N and the position of the reference frame based on the dominant motion allows the video super-resolution module 300 to keep the video frames that are the closest to the reference frame in the buffer 330. The circular buffer 330 can be implemented in hardware, software or firmware.

Figure 7:
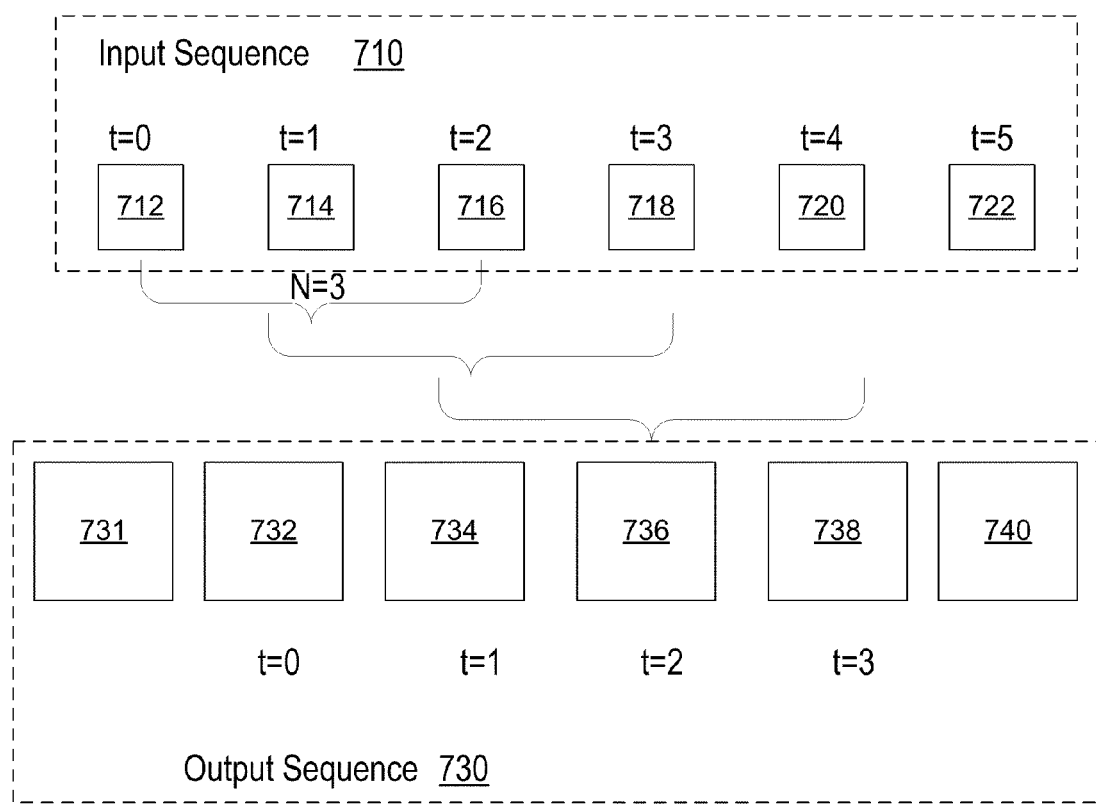
FIG. 7 is an exemplary sliding window using a circular buffer for video super-resolution processing.

To further illustrate the circular buffer 330 used by the video super-resolution module 200, FIG. 7 is an exemplary sliding window using the circular buffer 330 for video super-resolution processing. The input video sequence (i.e., the input low-resolution video) 710 comprises multiple video frames in a temporal order. In the example illustrated in FIG. 7, the input video sequence 710 has six video frames captured in a temporal order, e.g., from time 0 (t=0) to time 5 (t=5). A circular buffer of a size 3 (N=3) is used by the video super-resolution module 300 to store the three most recent video frames, and the reference frame in the circular buffer is at the center of the buffer. An incoming frame replaces the oldest frame present in the buffer. For each reference frame, the video super-resolution module 300 creates a super-resolution frame using the modules described with reference to FIG. 3.

For example, initially, the circular buffer has three most recent frames 712, 714 and 716 and frame 714 is the reference frame and frames 712 and 716 are non-reference frames. The video super-resolution module 300 creates a super-resolution frame 732 of the reference frame 714 using the non-reference frames 712 and 716, and outputs the super-resolution frame 732 to an output buffer. The video super-resolution module 300 slides the circular buffer to process the next video frame. The circular buffer now comprises video frames 714, 716 and 718 and the incoming video frame 718 replaces the oldest frame 712 in the circular buffer. The new reference frame becomes frame 716 and two non-reference frames are frames 714 and 718. The video super-resolution module 300 creates a super-resolution frame 734 for the reference frame 716 and outputs the super-resolution frame 734 to the output buffer. Similarly, the video super-resolution module 300 processes the rest of the video frames of the low-resolution video. The video super-resolution module 300 combines the super-resolution frames in the output buffer to generate the output video sequence 730.

The beginning and the end of the sequence represent some special cases that are managed selecting the reference frame at a position different of the central one. For example, to produce the super-resolution frame 731, corresponding to the input frame 712, the circular buffer contains the frames 712, 714, 716 (as done for the output frame 732) but the reference frame is set to the frame 712. Similarly, to produce the super-resolution frame 740, corresponding to the input frame 722, the circular buffer contains the frames 718, 720, 722 (as for the case of the output frame 738) and the reference is set to the frame 722. If the input sequence is composed by multiple scenes, the beginning and the end of each scene is detected. Each scene is then processed independently as described for the sequence of FIG. 7.

Figure 8:
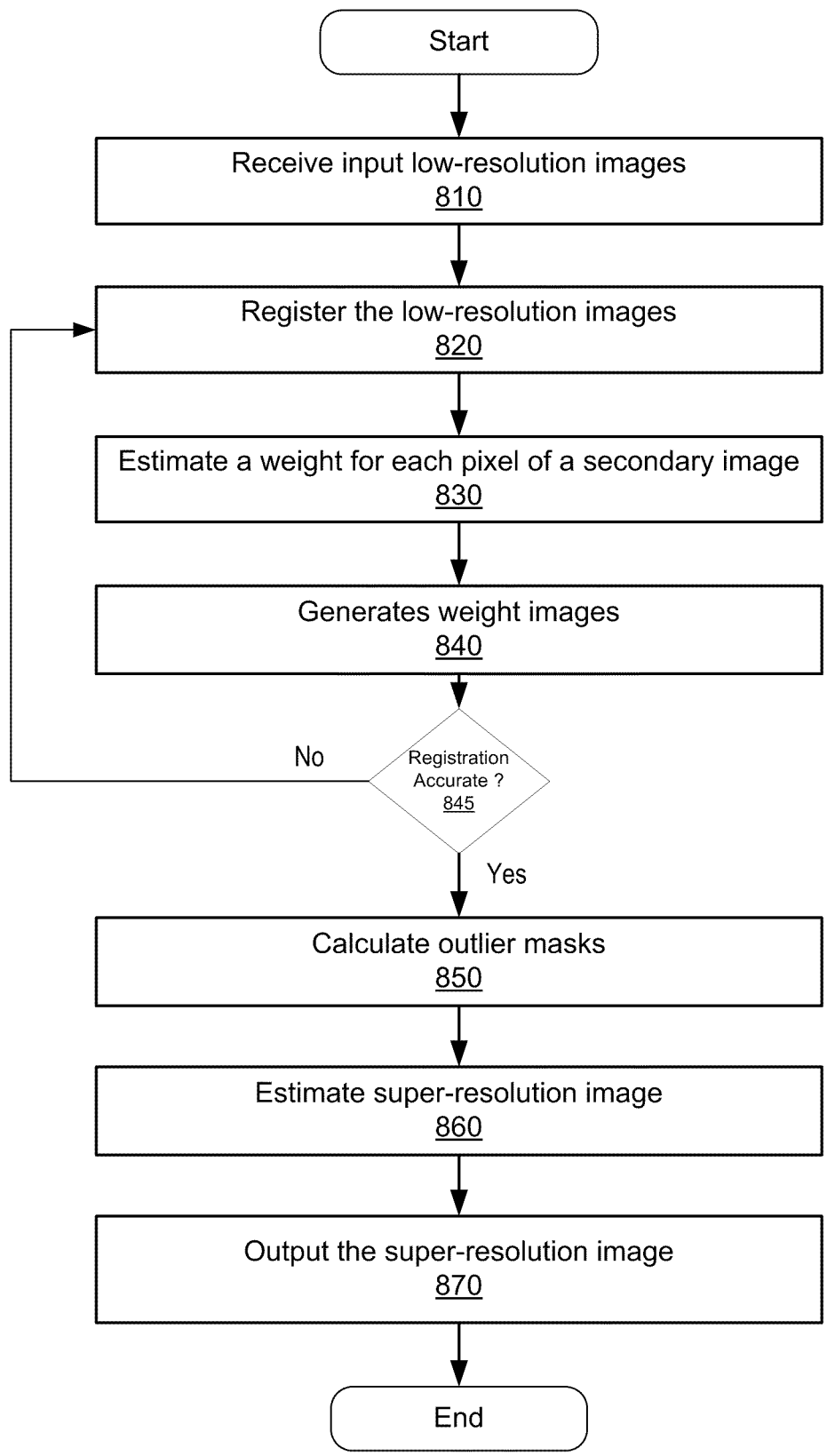
FIG. 8 is a flow chart of image super-resolution processing.

FIG. 8 is a flow chart of image super-resolution processing by the image super-resolution module 200. Initially, the image super-resolution module 200 receives 810 multiple low-resolution images comprising a primary image and multiple secondary images, and registers 820 the low-resolution images by estimating a displacement measurement between each secondary image and the primary image using a cost function. The image super-resolution module 200 estimates 830 a weight for each pixel of a secondary image and generates 840 the weighted secondary images. The accuracy of image registration is measured 845. If the accuracy of the image registration is not sufficient (e.g., the registration error larger than a predetermined threshold value), a new registration step is performed taking into account the new weighted images. To locate regions in a secondary image that do not follow the motion dominant across the low-resolution images, the image super-resolution module 200 calculates 850 outlier mask values for each of the low-resolution image. Pixels of a low-resolution image having a lower mask value are less likely to contribute to the creation of the super-resolution image of the primary image than those having a higher mask value. For pixels of the primary image, the mask value for each pixel is 1 because each pixel of the primary image is used to create the super-resolution image. Based on the motion compensated low-resolution images and the mask values associated with the low-resolution images, the image super-resolution module 200 estimates 860 the super-resolution image of the primary image. The image super-resolution module 200 evaluates each possible super-resolution image of the primary image to be estimated and minimizes a cost function to choose the best possible super-resolution image of the primary image. The image super-resolution engine outputs 870 the generated super-resolution image of the primary image.

Figure 9:
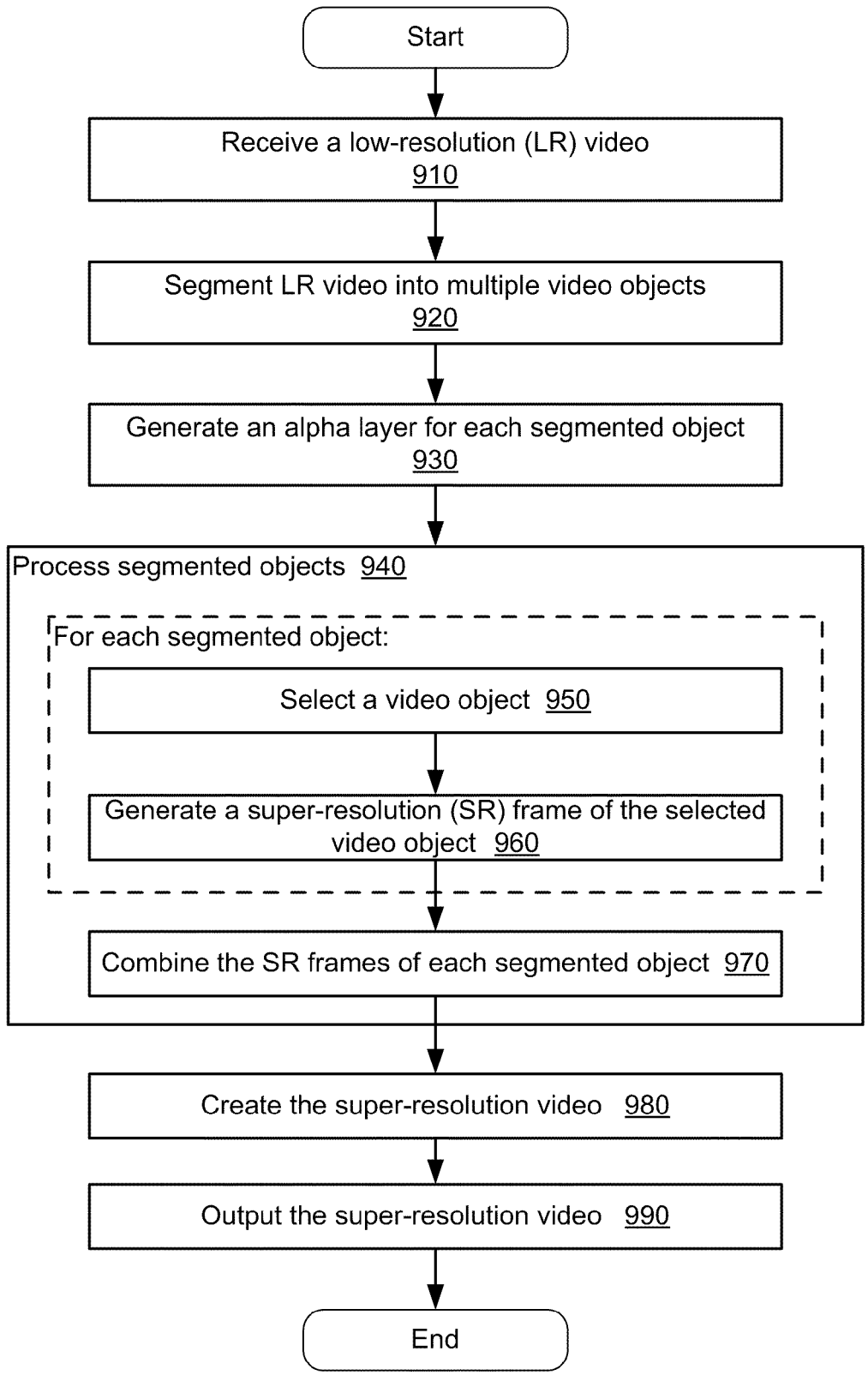
FIG. 9 is a flow chart of video super-resolution processing.

FIG. 9 is a flow chart of video super-resolution processing using the video super-resolution module 300 described above. Initially, the video super-resolution module 300 receives 910 a low-resolution video, and segments 920 the low-resolution video into multiple video objects. For each segmented video object, the video super-resolution module 300 generates 930 an alpha layer to represent the segmented video object. The video super-resolution module 300 processes 940 the segmented video objects independently using multiple image super-resolution modules 200 described with reference to FIG. 2. The video resolution engine selects 950 a segmented video object and generates 960 a super-resolution frame of the selected video object. The video super-resolution module 300 combines 970 the super-resolution frames corresponding to the different video objects to create a super-resolution frame of the output video. The video super-resolution module 300 sequentially creates a super-resolution frame for each input video frame of the lower-resolution video using the steps 950-970 to create 980 the super-resolution video and outputs 990 the super-resolution video.

Figure 10:
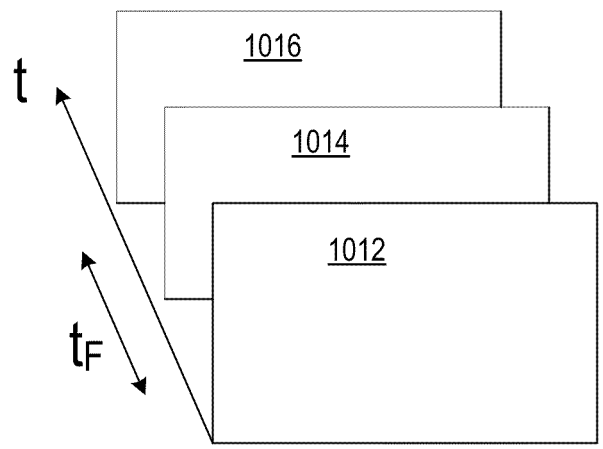
FIG. 10 is an exemplary video super-resolution processing with frame rate conversion.
Figure 10:
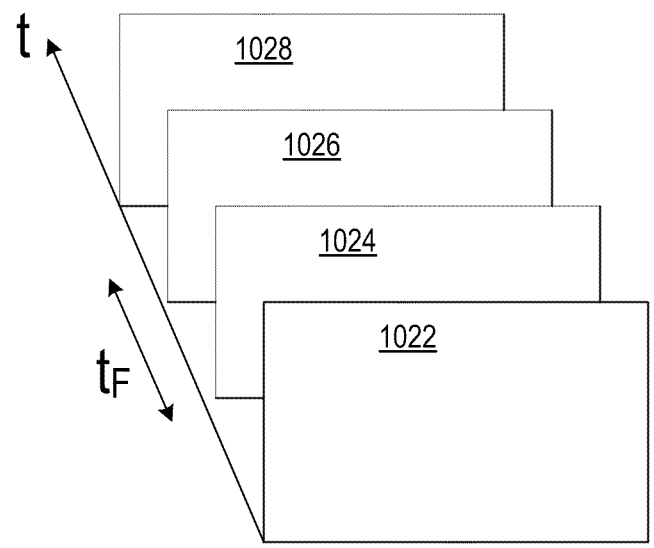

One application of video super-resolution processing described above is in super-resolution video generation with frame rate conversion. Frame rate conversion refers to generating the super-resolution video with a higher frame rate than the frame rate of the input low-resolution video. FIG. 10 is an exemplary video super-resolution processing with frame rate conversion. The low-resolution video has a frame rate 3 fps (frames per second) and the output super-resolution video has a frame rate 4 fps. Due to the higher frame rate of the super-resolution video, the output video frames 1022-1028 no longer correspond one-to-one to the input video frames 1010 as the scenario described with reference to FIG. 3 and FIG. 9. In one embodiment, the video super-resolution module 300 modifies the vector $\theta_i$ of the equation (4) or (5) to correctly map an output frame of the super-resolution video to the input frame(s) of the low-resolution video. In one embodiment, the video super-resolution module 300 first computes the motion parameters of an output frame with reference to an input frame of the low-resolution video which is temporally closer to the output frame. The video super-resolution module 300 corrects the computed motion parameters with a term proportional to the time difference between the output frame and the reference frame.

Figure 11:
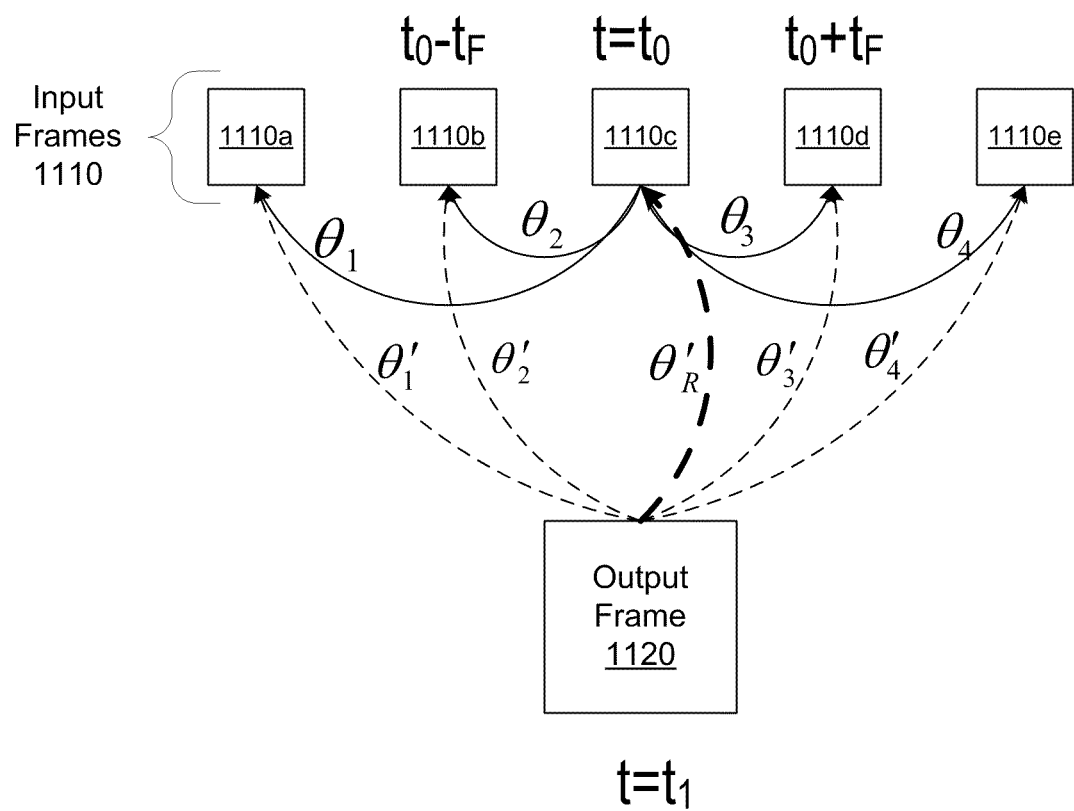
FIG. 11 shows motion parameters computation for frame rate conversion for video super-resolution processing.

FIG. 11 shows motion parameters computation for video super-resolution processing with frame rate conversion. The video super-resolution module 300 receives as input low-resolution video comprising multiple video frames 1110 (1110a-1110e) stored in the circular buffer 330. Output frame 1120 of the super-resolution video is created for time $t_1$. If $t_1$ corresponds to the time of one of the input frames, that frame is selected as a reference frame and processing is same as described above for the video super-resolution module 300. If $t_1$ does not correspond to the time of any of the input frames, the frame at time $t_0$ closer to $t_1$ is determined. Taking the case of $$t_0 < t_1 < t_0 + \frac{T_F}{2},$$

where $T_F$ is the frame period of the input video. The video super-resolution module 300 selects the input frame at time $t_0$, that is 1110c, as the reference frame to the output frame 1120 and computes the motion parameters $\theta_i$, i=1, . . . , 4 for the input frames 1110 (except the reference frame 1110c) with respect to the reference frame 1110c. The motion parameters $\theta_i'$, i=1=1, . . . , 4, and $\theta_R'$; map the output frame 1120 to the input frames stored in the circular buffer 330, where $\theta_R'$ maps the output frame 1120 to the reference frame 1110c. In one embodiment, $\theta_R'$ is obtained by inverting and scaling the motion parameters $\theta_3$ as the following:

$$\theta_R' = \frac{t_1 - t_0}{T_F} \theta_3^{-1}, \tag{6}$$

where $\theta_3^{-1}$ are the inverse of the motion parameters $\theta_3$. The remaining motion parameters are obtained by composing $\theta_R'$ with the parameters $\theta_i$, i.e.

$$\theta_i' = \theta_R' \circ \theta_i, i=1, \ldots, 4.$$

The video super-resolution module 300 minimizes the cost function described in equations (4) and (5) to estimate the super-resolution image of the output frame 1120 similar to the process of video super-resolution video described above. The case of $t_1 < t_0$ is treated in a similar way by replacing equation (6) with the following:

$$\theta_R' = \frac{t_0 - t_1}{T_F} \theta_2.$$

Another application of the video super-resolution processing can be similarly applied to interlaced-progressive frame conversion. For example, the video super-resolution module 300 receives an interlaced low-resolution video and produces a progressive super-resolution video. An interlaced video is composed by a sequence of fields. Each field encodes only a subset of the frame lines. For example, the sequence can be composed by an alternation of even fields, encoding the lines at even positions, and odd fields, encoding the lines at odd positions. To support the interlace-to-progressive video format conversion, the video super-resolution module 300 computes the motion parameters of cost function described in equation (4) by taking into account the vertical shift of one frame line between the even and the odd fields. Since the shift is known in advance, the registration module 210 of the image super-resolution module 200 assigns a constant value to the shift. Similarly, the video super-resolution module 300 processes the progressive-to-interlace conversion for the super-resolution video.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with primary to any particular programming language. It is appreciated that a variety of programming languages may be used to implement the teachings of the present invention as described herein, and any reference to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for creating a super-resolution video frame from multiple low-resolution video frames, the method comprising:

receiving a plurality of low-resolution video frames including a primary video frame and a plurality of secondary video frames;

for a secondary video frame:

iteratively estimating weights for pixels of the secondary video frame based on a registration error of the secondary video frame with respect to the primary video frame, a weight of a pixel of the secondary video frame indicating how likely the pixel of the secondary video frame follows a dominant motion model estimated for the secondary video frame, and the weights identifying a plurality of pixels of the secondary video frame that do not follow the dominant motion model estimated for the secondary video frame;

generating a motion compensated secondary video frame based on the estimated weights of the pixels of the secondary video frame, wherein the generated motion compensated secondary video frame is a super-resolution video frame candidate for the primary video frame;

calculating mask values for pixels of the motion compensated secondary video frame, wherein a mask value of a pixel of the motion compensated secondary video frame is estimated based on a multiresolution decomposition of the primary video frame and the secondary video frame; and generating a super-resolution video frame of the primary video frame based on the motion compensated secondary video frame and the mask values of the motion compensated secondary video frame, wherein generating the super-resolution video frame of the primary video frame comprises:

replacing regions of the secondary video frame with corresponding regions of the primary video frame, the replaced regions of the secondary video frame identified by the mask values for pixels of the secondary video frame; and using a cost function to select a super-resolution image of the primary video frame from a set of super-resolution video frame candidates for the primary video frame.

2. The method of claim 1, wherein generating the motion compensated secondary video frame comprises generating the motion compensated secondary video frame based on a displacement measure of the secondary video frame from the primary video frame.

3. The method of claim 2, further comprising minimizing a residual error of the motion compensated secondary video frame with respect to the primary video frame using a cost function.

4. The method of claim 2, further comprising updating motion parameters of the secondary video frame for a predetermined number of refinements.

5. The method of claim 1, wherein calculating the mask values for pixels based on a multiresolution decomposition of the primary video frame and the secondary video frame comprises computing an absolute difference between the primary video frame and the secondary video frame at each decomposition level.

6. The method of claim 5, further comprising applying a thresholding function to the absolute difference to generate the mask values for the secondary video frame.

7. The method of claim 1, wherein the mask value of a pixel of the motion compensated secondary video frame indicates a likelihood of the pixel to be included in the super-resolution video frame.

8. A method for creating a super-resolution video from a low-resolution video, the method comprising:
  receiving a low-resolution video, the low-resolution video comprising a plurality of video frames in a temporal order;
  segmenting the low-resolution video into a plurality of video objects, each segmented video object being represented by an alpha layer and each segmented video object being contained by a plurality of frames of the low-resolution video;
  for a video frame of the plurality of video frames of the low-resolution video:
    for a segmented video object in the video frame, generating a super-resolution frame of the segmented video object from a primary frame of the segmented video object and a plurality of secondary frames of the same segmented video object, the primary frame being selected based on a type of motion dominant across the plurality of video frames of the low-resolution video, the motion dominant in a video frame of the plurality video frames of the low-resolution video identifying a region in the video frame that does not follow the motion, wherein generating the super-resolution video frame of the segmented video object comprises:
      replacing regions of a secondary video frame of the same segmented video object with corresponding regions of the primary video frame of the segmented video object, the replaced regions of the secondary video frame identified by mask values for pixels of the secondary video frame;
      using a cost function to select a super-resolution image as the super-resolution frame of the segmented video object from a set of super-resolution video frame candidates, the set of super-resolution video frame candidates comprising a plurality of secondary frames of the segmented video object; and
    combining the super-resolution frames of each segmented video object to create corresponding super-resolution frames for the plurality of video frames; and
  combining the corresponding super-resolution frames of the video frames of the low-resolution video to create the super-resolution video.

9. The method of claim 8, wherein generating a super-resolution frame of the segmented video object comprises:
  selecting a frame of a segmented video object as the primary frame, wherein the rest of the frames of the same segmented video objects are the secondary frames of the segmented video object;
  for a secondary frame of the same segmented video object of the plurality of frames:
    iteratively estimating weights for pixels of the secondary frame based on a registration error of the secondary frame and the primary frame, a weight of a pixel of the secondary video frame indicating how likely the pixel of the secondary video frame follows the motion dominant in the secondary video frame, and the weights identifying a plurality of pixels of the secondary video frame that do not follow the motion dominant in the secondary video frame;
    generating a motion compensated secondary frame based on the estimated weights of the pixels of the secondary frame;
    calculating mask values for pixels of the motion compensated secondary frame of the video object, wherein a mask value of a pixel of the motion compensated secondary frame is estimated based on a multiresolution decomposition of the primary video frame and the secondary frame; and
  generating the super-resolution frame of the segmented video object based on the motion compensated secondary frames and the mask values associated with the motion compensated secondary frames of the video object.

10. The method of claim 8, further comprising storing the plurality of secondary frames of the segmented video objects in a circular buffer.

11. The method of claim 8, further comprising creating the super-resolution video with a frame rate higher than the frame rate of the low-resolution video.

12. The method of claim 8, wherein the low-resolution video is an interlaced low-resolution video, and wherein combining the corresponding super-resolution frames of the video frames of the low-resolution video to create the super-resolution video comprises creating a progressive super-resolution video of the interlaced low-resolution video.

13. The method of claim 8, wherein the low-resolution video is a progressive low-resolution video, and wherein combining the corresponding super-resolution frames of the video frames of the low-resolution video to create the super-resolution video comprises creating an interlaced super-resolution video of the progressive low-resolution video.

14. The method of claim 8, wherein a mask value of a pixel of the secondary frame of the video object indicates a likelihood of the pixel of the secondary frame of the video object to be included in the super-resolution frame.

15. A system for creating a super-resolution video frame from multiple low-resolution video frames, the system comprising:
  a registration module configured to receive a plurality of low-resolution video frames including a primary video frame and a plurality of secondary video frames;

a weight estimation module configured to, for a secondary video frame, iteratively estimate weights for pixels of the secondary video frame based on a registration error of the secondary video frame with respect to the primary video frame, a weight of a pixel of the secondary video frame indicating how likely the pixel of the secondary video frame follows a dominant motion model estimated for the secondary video frame, and the weights identifying a plurality of pixels of the secondary video frame that do not follow the dominant motion model estimated for the secondary video frame, the weight estimation module coupled with the registration module;

the registration module configured to, for a secondary video frame, generate a motion compensated secondary video frame based on the estimated weights of the pixels of the secondary video frame, wherein the generated motion compensated secondary video frame is a super-resolution video frame candidate for the primary video frame;

an outlier mask module configured to, for a secondary video frame, calculate mask values for pixels of the motion compensated secondary video frame, wherein a mask value of a pixel of the motion compensated secondary video frame is estimated based on a multiresolution decomposition of the primary video frame and the secondary video frame, the outlier mask module coupled to the registration module and the weight estimation module; and an image super-resolution creation module configured to generate a super-resolution video frame of the primary video frame based on the motion compensated secondary video frame and the mask values of the motion compensated secondary video frame, the image super-resolution creation module coupled with the registration module and the outlier mask module, wherein generating the super-resolution video frame of the primary video frame comprises:

replacing regions of the secondary video frame with corresponding regions of the primary video frame, the replaced regions of the secondary video frame identified by the mask values for pixels of the secondary video frame; and using a cost function to select a super-resolution image of the primary video frame from a set of super-resolution video frame candidates for the primary video frame.

16. The system of claim 15, wherein the registration module is further configured to generate the motion compensated secondary video frame based on a displacement measure of the secondary video frame from the primary video frame.

17. The system of claim 16, wherein the registration module is further configured to minimize a residual error of the motion compensated secondary video frame with respect to the primary video frame using a cost function.

18. The system of claim 16, wherein the registration module is further configured to update motion parameters of the secondary video frame for a predetermined number of refinements.

19. The system of claim 15, wherein the outlier mask module is further configured to compute an absolute difference between the primary video frame and the secondary video frame at each decomposition level.

20. The system of claim 19, wherein the outlier mask module is further configured to apply a thresholding function to the absolute difference to generate the mask values for the secondary video frame.

21. The system of claim 15, wherein the mask value of a pixel of the motion compensated secondary video frame indicates a likelihood of the pixel to be included in the super-resolution video frame.

22. A system for creating a super-resolution video from a low-resolution video, the system comprising:

a segmentation module configured to:
  receive a low-resolution video, the low-resolution video comprising a plurality of video frames in a temporal order; and
  segment the low-resolution video into a plurality of video objects, each segmented video object being represented by an alpha layer and each segmented video object being contained by a plurality of frames of the low-resolution video;

one or more image super-resolution modules, coupled with the segmentation module, configured to:
  for a video frame of the plurality of video frames of the low-resolution video:
    for a segmented video object in the video frame, generate a super-resolution frame of the segmented video object from a primary frame of the segmented video object and a plurality of secondary frames of the same segmented video object, the primary frame being selected based on a type of motion dominant across the plurality of video frames of the low-resolution video, the motion dominant in a video frame of the plurality video frames of the low-resolution video identifying a region in the video frame that does not follow the motion, wherein generating the super-resolution video frame of the segmented video object comprises:
      replacing regions of a secondary video frame of the same segmented video object with corresponding regions of the primary video frame of the segmented video object, the replaced regions of the secondary video frame identified by mask values for pixels of the secondary video frame; and
      using a cost function to select a super-resolution image as the super-resolution frame of the segmented video object from a set of super-resolution video frame candidates, the set of super-resolution video frame candidates comprising a plurality of secondary frames of the segmented video object; and an alpha blending module, coupled with the one or more of the image super-resolution modules, configured to:
  combine the super-resolution frames of each segmented video object to create corresponding super-resolution frames for the plurality of video frames; and
  combine the corresponding super-resolution frames of the video frames of the low-resolution video to create the super-resolution video.

23. The system of claim 22, wherein an image super-resolution module is further configured to:
select a frame of a segmented video object as the primary frame, wherein the rest of the frames of the same segmented video objects are the secondary frames of the segmented video object;
for a secondary frame of the same segmented video object of the plurality of frames:
  iteratively estimate weights for pixels of the secondary frame based on a registration error of the secondary frame and the primary frame, a weight of a pixel of the secondary video frame indicating how likely the pixel of the secondary video frame follows the motion dominant in the secondary video frame, and the weights identifying a plurality of pixels of the secondary video frame that do not follow the motion dominant in the secondary video frame;

generate a motion compensated secondary frame based on the estimated weights of the pixels of the secondary frame;

calculate mask values for pixels of the motion compensated secondary frame of the video object, wherein a mask value of a pixel of the motion compensated secondary frame is estimated based on a multiresolution decomposition of the primary video frame and the secondary frame; and generate the super-resolution frame of the segmented video object based on the motion compensated secondary frames and the mask values associated with the motion compensated secondary frames of the video object.

24. The system of claim 22, further comprising a circular buffer configured to store the plurality of secondary frames of the segmented video objects.

25. The system of claim 22, wherein the super-resolution video has a frame rate higher than the frame rate of the low-resolution video.

26. The system of claim 22, wherein the low-resolution video is an interlaced low-resolution video, and wherein the super-resolution video is a progressive super-resolution video of the interlaced low-resolution video.

27. The system of claim 22, wherein the low-resolution video is a progressive low-resolution video, and wherein the super-resolution video is an interlaced super-resolution video of the progressive low-resolution video.

28. The system of claim 22, wherein a mask value of a pixel of the secondary frame of the video object indicates a likelihood of the pixel of the secondary frame of the video object to be included in the super-resolution frame.

29. A non-transitory computer-readable storage medium having executable computer program instructions recorded thereon, the computer program instructions configuring a computer system to comprise:

a registration module configured to receive a plurality of low-resolution video frames including a primary video frame and a plurality of secondary video frames;

a weight estimation module configured to, for a secondary video frame, iteratively estimate weights for pixels of the secondary video frame based on a registration error of the secondary video frame with respect to the primary video frame, the weight estimation module coupled with the registration module, a weight of a pixel of the secondary video frame indicating how likely the pixel of the secondary video frame follows a dominant motion model estimated for the secondary video frame, and the weights identifying a plurality of pixels of the secondary video frame that do not follow the dominant motion model estimated for the secondary video frame;

the registration module configured to, for a secondary video frame, generate a motion compensated secondary video frame based on the estimated weights of the pixels of the secondary video frame, wherein the generated motion compensated secondary video frame is a super-resolution video frame candidate for the primary video frame;

an outlier mask module configured, for a secondary video frame, calculate mask values for pixels of the motion compensated secondary video frame, wherein a mask value of a pixel of the motion compensated secondary video frame is estimated based on a multiresolution decomposition of the primary video frame and the secondary video frame, the outlier mask module coupled to the registration module and the weight estimation module; and an image super-resolution creation module configured to generate a super-resolution video frame of the primary video frame based on the motion compensated secondary video frames and the mask values of the motion compensated secondary video frame, wherein generating the super-resolution video frame of the primary video frame comprises:

replacing regions of the secondary video frame with corresponding regions of the primary video frame, the replaced regions of the secondary video frame identified by the mask values for pixels of the secondary video frame, the image super-resolution creation module coupled with the registration module and the outlier mask module; and using a cost function to select a super-resolution image of the primary video frame from a set of super-resolution video frame candidates for the primary video frame.

30. A non-transitory computer-readable storage medium having executable computer program instructions recorded thereon, the computer program instructions configuring a computer system to comprise:

a segmentation module configured to:
receive a low-resolution video, the low-resolution video comprising a plurality of video frames in a temporal order; and
segment the low-resolution video into a plurality of video objects, each segmented video object being represented by an alpha layer and each segmented video object being contained by a plurality of frames of the low-resolution video;

one or more image super-resolution modules, coupled with the segmentation module, configured to:
for a video frame of the plurality of video frames of the low-resolution video:
for a segmented video object in the video frame, generate a super-resolution frame of the segmented video object from a primary frame of the segmented video object and a plurality of secondary frames of the same segmented video object, the primary frame being selected based on a type of motion dominant across the plurality of video frames of the low-resolution video, the motion dominant in a video frame of the plurality video frames of the low-resolution video identifying a region in the video frame that does not follow the motion, wherein generating the super-resolution video frame of the segmented video object comprises:

replacing regions of a secondary video frame of the same segmented video object with corresponding regions of the primary video frame of the segmented video object, the replaced regions of the secondary video frame identified by mask values for pixels of the secondary video frame; and using a cost function to select a super-resolution image as the super-resolution frame of the segmented video object from a set of super-resolution video frame candidates, the set of super-resolution video frame candidates comprising a plurality of secondary video frames of the segmented video object; and an alpha blending module, coupled with the plurality of the image super-resolution modules, configured to:
  combine the super-resolution frames of each segmented video object to create corresponding super-resolution frames for the plurality of the video frames; and
  combine the corresponding super-resolution frames of the video frames of the low-resolution video to create the super-resolution video.

31. A method for creating a super-resolution video frame from multiple low-resolution video frames, the method comprising:
  receiving a plurality of low-resolution video frames including a primary video frame and a plurality of secondary video frames;
  for a secondary video frame selected from the plurality of the low-resolution video frames:
    iteratively estimating weights for pixels of the secondary video frame based on a registration error of the secondary video frame with respect to the primary video frame, a weight of a pixel of the secondary video frame indicating how likely the pixel of the secondary video frame follows a dominant motion model estimated for the secondary video frame, and the weights identifying a plurality of pixels of the secondary video frame that do not follow the dominant motion model estimated for the secondary video frame;
    generating a motion compensated secondary video frame based on the estimated weights of the pixels of the secondary video frame, wherein the generated motion compensated secondary video frame is a super-resolution video frame candidate for the primary video frame;
    calculating mask values for pixels of the motion compensated secondary video frame, wherein a mask value of a pixel of the motion compensated secondary video frame is estimated based on a multiresolution decomposition of the primary video frame and the secondary video frame; and
  generating a super-resolution video frame of the primary video frame based on the motion compensated secondary video frame and the mask values of the motion compensated secondary video frame, wherein generating the super-resolution video frame of the primary video frame comprises:
    replacing regions of the secondary video frame with corresponding regions of the primary video frame, the replaced regions of the secondary video frame identified by the mask values for pixels of the secondary video frame; and
  using a cost function to select a super-resolution image of the primary video frame from a set of super-resolution video frame candidates for the primary video frame.

* * * * *